US 10,175,566 B2

(12) United States Patent
Matsubara et al.

(10) Patent No.: US 10,175,566 B2
(45) Date of Patent: Jan. 8, 2019

(54) LIGHT SOURCE DEVICE, ILLUMINATION DEVICE, AND PROJECTOR

(71) Applicant: SEIKO EPSON CORPORATION, Tokyo (JP)

(72) Inventors: Takayuki Matsubara, Chino (JP); Koichi Akiyama, Matsumoto (JP); Noriyuki Hirano, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/558,483

(22) PCT Filed: Mar. 11, 2016

(86) PCT No.: PCT/JP2016/001370
§ 371 (c)(1),
(2) Date: Sep. 14, 2017

(87) PCT Pub. No.: WO2016/157754
PCT Pub. Date: Oct. 6, 2016

(65) Prior Publication Data
US 2018/0067387 A1 Mar. 8, 2018

(30) Foreign Application Priority Data
Mar. 27, 2015 (JP) .................. 2015-066735

(51) Int. Cl.
*G03B 21/14* (2006.01)
*G03B 21/20* (2006.01)
(Continued)

(52) U.S. Cl.
CPC .............. *G03B 21/208* (2013.01); *F21S 2/00* (2013.01); *F21V 9/30* (2018.02); *G02B 19/00* (2013.01);
(Continued)

(58) Field of Classification Search
CPC ...................................... G03B 21/14–21/2093
See application file for complete search history.

(56) References Cited

U.S. PATENT DOCUMENTS

2004/0252744 A1 12/2004 Anikitchev et al.
2008/0278690 A1* 11/2008 Maeda ................. G02B 27/285
353/20
(Continued)

FOREIGN PATENT DOCUMENTS

JP 2000347589 A * 12/2000
JP 2004-12620 A 1/2004
(Continued)

OTHER PUBLICATIONS

Nov. 29, 2018 Search Report issued in European Patent Application No. 16771648.9.

*Primary Examiner* — Christle I Marshall
(74) *Attorney, Agent, or Firm* — Oliff PLC

(57) ABSTRACT

A light source device, an illumination device, and a projector which are capable of thinning a bundle of light beams while being low in a focal magnification ratio, and are small in size are to be provided. The light source device includes a first light source unit adapted to emit a first light beam, a second light source unit adapted to emit a bundle of light beams including a second light beam and a third light beam, a reduction optical system adapted to reduce the bundle of light beams, and a combining optical system adapted to combine the first light beam and the reduced bundle of light beams with each other. The combining optical system is provided with a light transmitting area and a light reflecting area.

12 Claims, 6 Drawing Sheets

(51) Int. Cl.
*F21V 9/30* (2018.01)
*F21S 2/00* (2016.01)
*G02B 19/00* (2006.01)
*G03B 21/00* (2006.01)

(52) U.S. Cl.
CPC ............ *G03B 21/00* (2013.01); *G03B 21/14* (2013.01); *G03B 21/204* (2013.01); *G03B 21/2066* (2013.01)

(56) References Cited

U.S. PATENT DOCUMENTS

| | | |
|---|---|---|
| 2012/0081622 A1* | 4/2012 | Horikoshi ............ G02B 27/286 349/9 |
| 2012/0133903 A1 | 5/2012 | Tanaka |
| 2012/0162614 A1 | 6/2012 | Kobayashi et al. |
| 2012/0194768 A1* | 8/2012 | Horikoshi ............ G02B 5/3083 349/96 |
| 2013/0162956 A1 | 6/2013 | Okuda |

FOREIGN PATENT DOCUMENTS

| | | |
|---|---|---|
| JP | 2012-133337 A | 7/2012 |
| JP | 2012-141411 A | 7/2012 |
| JP | 2013-114980 A | 6/2013 |
| JP | 2013-130692 A | 7/2013 |
| JP | 2013-190674 A | 9/2013 |
| JP | 2014-62985 A | 4/2014 |

\* cited by examiner

LIGHT SOURCE DEVICE, ILLUMINATION DEVICE, AND PROJECTOR

TECHNICAL FIELD

The present invention relates to a light source device, an illumination device, and a projector.

BACKGROUND ART

As a light source device for a projector, there has been known what is arranged to evenly illuminate a phosphor layer with light from a plurality of light source units using a lens integrator (see, e.g., PTL 1).

CITATION LIST

Patent Literature

PTL 1: JP-A-2013-114980

SUMMARY OF INVENTION

Technical Problem

Incidentally, it is conceivable that, for example, by decreasing the size of a bundle of light beams using an afocal optical system as a reduction system, an optical element disposed on the posterior stage of a lens integrator or the like is made smaller to thereby miniaturize a light source device. It should be noted that in the present specification, the afocal optical system as a reduction system is simply referred to as an afocal optical system in some cases. Further, the expression "high in afocal magnification ratio" means that a high luminous flux width compression ratio can be obtained, and the expression "low in afocal magnification ratio" means that a low luminous flux width compression ratio can be obtained.

In the case in which the afocal magnification ratio is high, high alignment accuracy is required for a light source unit. Therefore, it is necessary to hold the afocal magnification ratio to a rather low level taking the installation variation of the light source unit into consideration. However, if the afocal magnification ratio is low, it is not possible to make the luminous flux width of the light entering the lens integrator sufficiently small, and by extension, there is a problem that it is not possible to miniaturize the optical element disposed in the posterior stage such as the lens integrator.

The invention is made for solving the problem described above, and has an object of providing a light source device capable of easily reducing the bundle of light beams. Further, the invention has an object of providing an illumination device equipped with the light source device and a projector equipped with the illumination device.

Solution to Problem

According to a first aspect of the invention, there is provided a light source device including a first light source unit adapted to emit a first light beam, a second light source unit adapted to emit a bundle of light beams including a second light beam and a third light beam arranged in a first direction, a reduction optical system adapted to reduce the bundle of light beams in the first direction to emit as a reduced bundle of light beams, and a combining optical system adapted to one of transmit and reflect the first light beam and one of reflect and transmit the reduced bundle of light beams to thereby combine the first light beam and the reduced bundle of light beams with each other, wherein defining a plane including an optical axis of the reduced bundle of light beams and parallel to the first direction as a reference plane, a distance between the first light beam and the reference plane is different from a distance between the second light beam and the reference plane, the reduction optical system reduces a distance between the second light beam and the third light beam in the first direction, and emits the second light beam and the third light beam as a fourth light beam and a fifth light beam, respectively, the combining optical system is provided with a light transmitting area having a long side parallel to the reference plane and a light reflecting area having a long side parallel to the reference plane, and the first light beam enters one of the light transmitting area and the light reflecting area, and the fourth light beam and the fifth light beam enter the other of the light transmitting area and the light reflecting area.

According to the light source device related to the first aspect, the bundle of light beams emitted from the second light source unit can be efficiently reduced in the first direction and then emitted by the reduction optical system. Thus, it is possible to miniaturize, for example, the optical system disposed in the posterior stage of the combining optical system. It should be noted that in the present specification, the expression that the bundle of light beams is reduced in the first direction denotes that the bundle of light beams is reduced in a direction parallel to the first direction.

In the first aspect of the invention described above, it is preferable that a cross-sectional shape of the second light beam and a cross-sectional shape of the third light beam both have a longitudinal direction in the first direction.

According to this configuration, the loss of the second light beam and the third light beam due to the reduction optical system is small.

In the first aspect of the invention described above, it is preferable that there is further included a second reduction optical system, the first light source unit further emits a sixth light beam, the sixth light beam is arranged with the first light beam in a second direction crossing the first direction, the second reduction optical system reduces a distance between the first light beam and the sixth light beam in the second direction, and emits the first light beam and the sixth light beam as a seventh light beam and an eighth light beam, respectively, and the seventh light beam and the eighth light beam enter one of the light transmitting area and the light reflecting area.

According to this configuration, it is possible to reduce the bundle of light beams formed of a plurality of light beams emitted from the first light source unit with the second reduction optical system.

According to a second aspect of the invention, there is provided an illumination device including the light source device according to the first aspect of the invention, a wavelength conversion element, and alight guide optical system adapted to guide at least a part of the first light, the fourth light beam, and the fifth light beam to the wavelength conversion element.

According to the second aspect, it is possible to provide a small sized illumination device.

According to a third aspect of the invention, there is provided a projector including the illumination device according to the second aspect of the invention, a light modulation device adapted to modulate light emitted from the illumination device in accordance with image information to thereby form image light, and a projection optical system adapted to project the image light.

According to the third aspect, it is possible to realize a small sized projector.

DESCRIPTION OF EMBODIMENTS

An embodiment of the invention will hereinafter be described in detail with reference to the drawings.

It should be noted that the drawings used in the following description show characteristic parts in an enlarged manner in some cases for the sake of convenience in order to make the characteristics easy to understand, and the dimensional ratios between the constituents and so on are not necessarily the same as actual ones.

First Embodiment

Firstly, an example of a projector according to the present embodiment will be described. The projector according to the present embodiment is a projection-type image display device for displaying a color picture (image) on a screen (a projection target surface) SCR. The projector 1 uses three light modulation devices corresponding respectively to colored light, namely red light, green light, and blue light. The projector uses a semiconductor laser (a laser source), with which high-intensity and high-power light can be obtained, as a light source of an illumination device.

(Projector)

Figure 1:
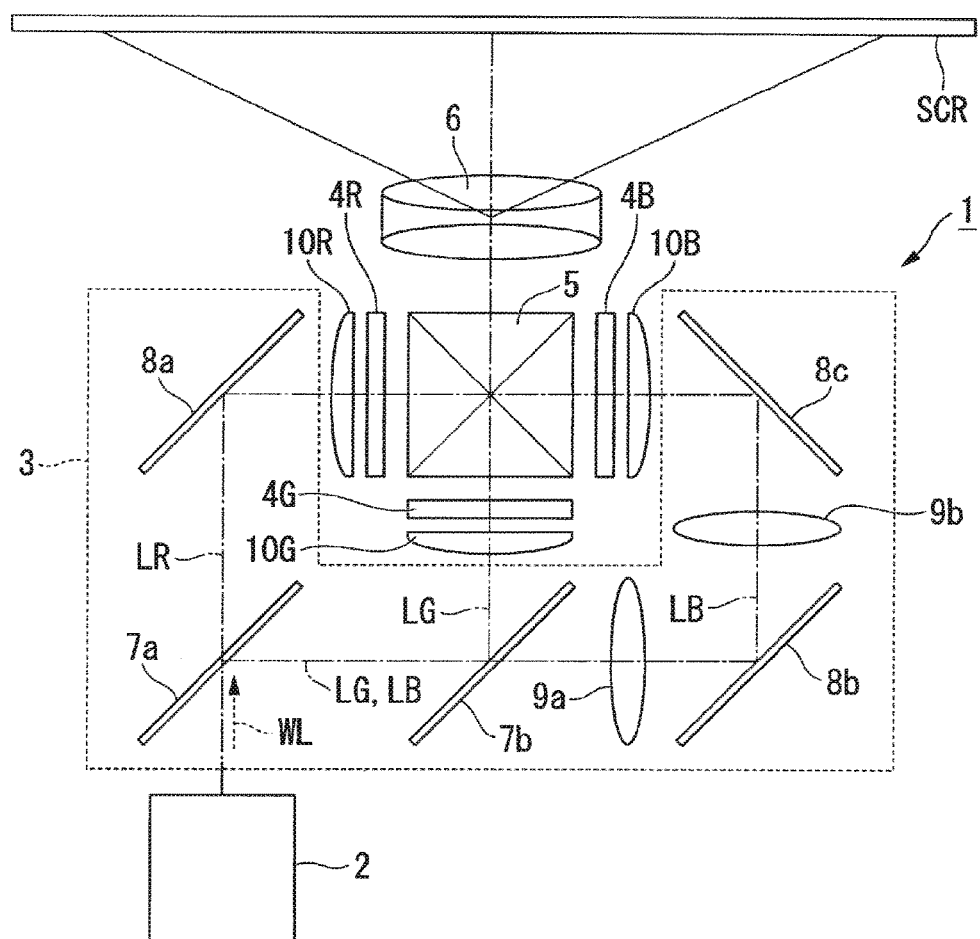
FIG. 1 is a plan view showing a schematic configuration of a projector.

FIG. 1 is a plan view showing a schematic configuration of the projector according to the present embodiment. As shown in FIG. 1, the projector 1 is provided with an illumination device 2, a color separation optical system 3, a light modulation device 4R, a light modulation device 4G, a light modulation device 4B, a light combining section 5, and a projection optical system 6.

The color separation optical system 3 is for separating illumination light WL into red light LR, green light LG, and blue light LB. The color separation optical system 3 is generally provided with a first dichroic mirror 7a and a second dichroic mirror 7b, a first total reflection mirror 8a, a second total reflection mirror 8b, and a third total reflection mirror 8c, and a first relay lens 9a and a second relay lens 9b.

The first dichroic mirror 7a has a function of separating the illumination light WL from the illumination device 2 into the red light LR and the rest of the light (the green light LG and the blue light LB). The first dichroic mirror 7a transmits the red light LR thus separated from, and at the same time reflects the rest of the light (the green light LG and the blue light LB). Meanwhile, the second dichroic mirror 7b has a function of separating the rest of the light into the green light LG and the blue light LB. The second dichroic mirror 7b reflects the green light LG thus separated from, while transmitting the blue light LB.

The first total reflection mirror 8a is disposed in the light path of the red light LR, and reflects the red light LR, which has been transmitted through the first dichroic mirror 7a, toward the light modulation device 4R. Meanwhile, the second total reflection mirror 8b and the third total reflection mirror 8c are disposed in the light path of the blue light LB to guide the blue light LB, which has been transmitted through the second dichroic mirror 7b, to the light modulation device 4B. The green light LG is reflected from the second dichroic mirror 7b toward the light modulation device 4G.

The first relay lens 9a and the second relay lens 9b are disposed on the light emission side of the second total reflection mirror 8b in the light path of the blue light LB. The first relay lens 9a and the second relay lens 9b have a function of compensating the optical loss of the blue light beam LB due to the fact that the optical path length of the blue light beam LB becomes longer than the optical path lengths of the red light beam LR and the green light beam LG.

The light modulation device 4R modulates the red light LR in accordance with image information to form image light corresponding to the red light LR. The light modulation device 4G modulates the green light LG in accordance with the image information to form image light corresponding to the green light LG. The light modulation device 4B modulates the blue light LB in accordance with the image information to form image light corresponding to the blue light LB.

As the light modulation device 4R, the light modulation device 4G, and the light modulation device 4B, there are used, for example, transmissive liquid crystal panels. Further, on the incident side and the exit side of the liquid crystal panel, there are disposed a pair of polarization plates (not shown), respectively, to form a configuration of transmitting only the linearly polarized light with a specific direction.

Further, on the incident side of the light modulation device 4R, the light modulation device 4G, and the light modulation device 4B, there are disposed a field lens 10R, a field lens 10G, and a field lens 10B, respectively. The field lens 10R, the field lens 10G, and the field lens 10B are for collimating the red light LR, the green light LG, and the blue light LB entering the light modulation device 4R, the light modulation device 4G, and the light modulation device 4B, respectively.

The image light from the light modulation device 4R, the light modulation device 4G, and the light modulation device 4B enters the light combining section 5. The light combining section 5 combines the image light corresponding to the red light LR, the green light LG, and the blue light LB, and then emits the image light thus combined toward the projection optical system 6. As the light combining section 5, there is used, for example, a cross dichroic prism.

The projection optical system 6 is formed of a projection lens group, and projects the image light combined by the light combining section 5 toward the screen SCR in an enlarged manner. Thus, a color picture thus enlarged is displayed on the screen SCR.

(Illumination Device)

Figure 2:
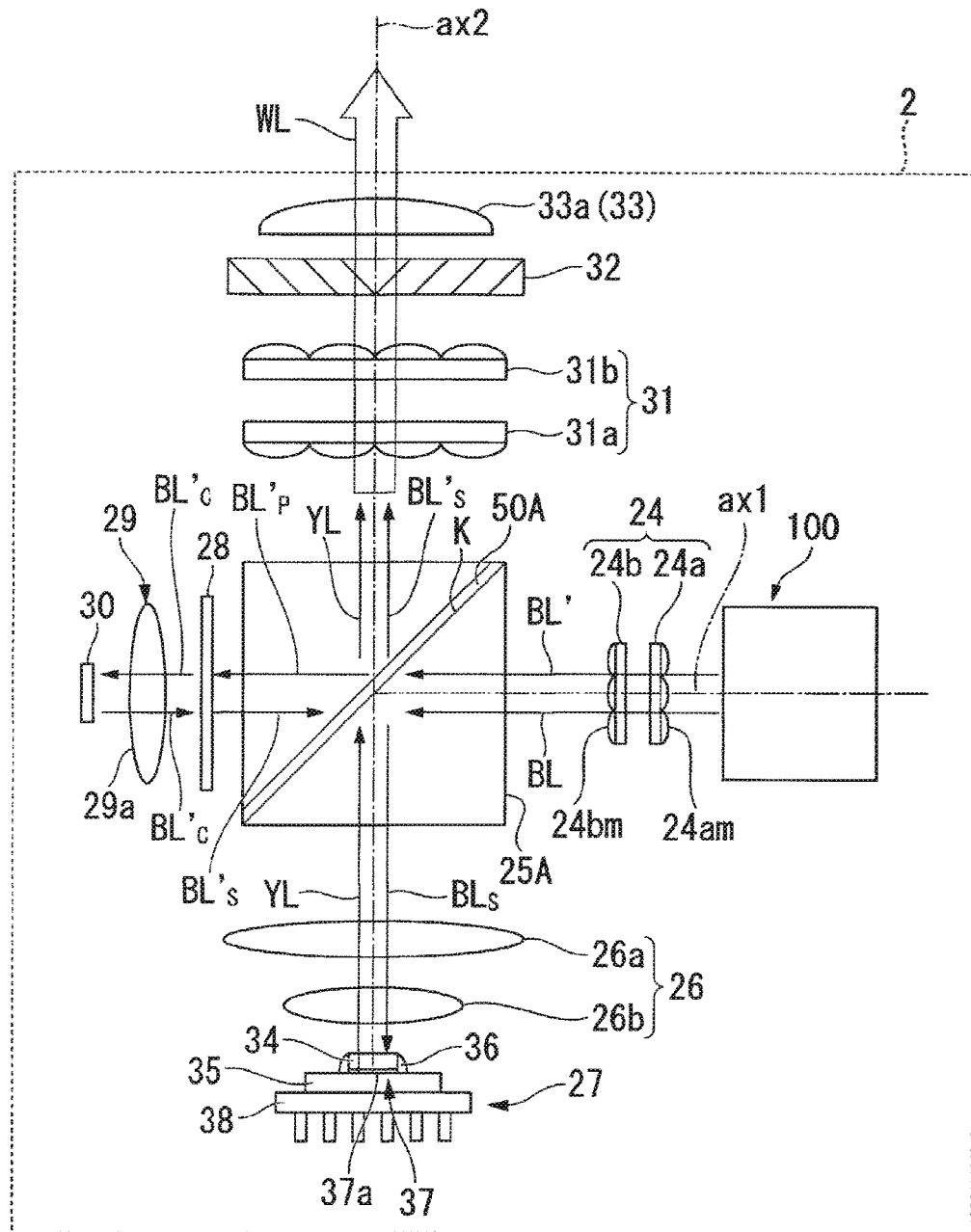
FIG. 2 is a diagram showing a schematic configuration of an illumination device.

Next, the illumination device 2 according to an embodiment of the invention will be described. FIG. 2 is a diagram showing a schematic configuration of the illumination device 2. As shown in FIG. 2, the illumination device 2 is provided with a light source device 100, an integrator optical system 24, an optical element 25A including a polarization separation element 50A, a first pickup optical system 26, a fluorescence emitting element (a wavelength conversion element) 27, a wave plate 28, a second pickup optical system 29, a diffuse reflection element 30, a homogenizer optical system 31, a polarization conversion element 32, and an overlapping optical system 33.

The light source device 100 emits excitation light BL and blue light BL'. It should be noted that the detailed configuration of the light source device 100 will be described later.

The excitation light BL and the blue light BL' enters the integrator optical system 24. The integrator optical system 24 is formed of a first multi-lens array 24a and a second multi-lens array 24b. The first multi-lens array 24a is provided with a plurality of small lenses 24am, and the second multi-lens array 24b is provided with a plurality of small lenses 24bm corresponding to the plurality of small lenses 24am.

The excitation light BL and the blue light BL' having been transmitted through the integrator optical system 24 enters the optical element 25A. The optical element 25A is formed of, for example, a dichroic prism having wavelength selectivity. The dichroic prism has a tilted surface K having an angle of 45° with an optical axis ax1. The tilted surface K also has an angle of 45° with an optical axis ax2.

The tilted surface K is provided with the polarization separation element 50A having wavelength selectivity. The polarization separation element 50A separates the excitation light BL and the blue light BL' into an S-polarized component and a P-polarized component with respect to this polarization separation element 50A.

Further, the polarization separation element 50A has a color separation function of transmitting fluorescence YL as second light described later and different in wavelength band from the excitation light BL and the blue light BL' irrespective of the polarization state.

The excitation light BL is S-polarized light to be reflected by the polarization separation element 50A. The blue light BL' is P-polarized light to be transmitted through the polarization separation element 50A.

Therefore, the excitation light BL is reflected by the polarization separation element 50A toward the fluorescence emitting element 27 as S-polarized excitation light BLs. In contrast, the blue light BL' is transmitted through the polarization separation element 50A toward the diffuse reflection element 30 as P-polarized blue light BL'p.

The S-polarized excitation light BLs having been emitted from the polarization separation element 50A enters the first pickup optical system 26. The first pickup optical system 26 converges the plurality of light beams (the excitation light BLs), which has been emitted from the second multi-lens array 24b, toward a phosphor layer 34, and at the same time overlaps the light beams with each other on the phosphor layer 34.

The first pickup optical system 26 is formed of, for example, a pickup lens 26a and a pickup lens 26b. The excitation light BLs having been emitted from the first pickup optical system 26 enters the fluorescence emitting element 27. The fluorescence emitting element 27 has the phosphor layer 34, a substrate 35 for supporting the phosphor layer 34, and a fixation member 36 for fixing the phosphor layer 34 to the substrate 35.

The phosphor layer 34 is fixed to the substrate 35 with the fixation member 36. The surface of the phosphor layer 34 on the opposite side to the side where the excitation light BLs enters has contact with the substrate 35.

The phosphor layer 34 includes a phosphor which absorbs the excitation light BLs with the wavelength of 440 nm to be excited, and the phosphor excited by the excitation light BLs generates the fluorescence (yellow light) YL having a peak wavelength in the wavelength band of, for example, 500 through 700 nm as second light.

As the phosphor layer 34, what is superior in heat resistance and surface workability is preferably used. As such a phosphor layer 34, a phosphor layer obtained by dispersing phosphor particles in an inorganic binder such as alumina, or a phosphor layer obtained by sintering the phosphor particles without using the binder, for example, can preferably be used.

On the opposite side of the phosphor layer 34 to the side where the excitation light BLs enters, there is disposed a reflecting section 37 as a first reflecting element. The reflecting section 37 has a function of reflecting the fluorescence YL generated by the phosphor layer 34.

On a surface of the substrate 35 opposite to the surface for supporting the phosphor layer 34, there is disposed a heatsink 38. In the fluorescence emitting element 27, since heat radiation can be achieved through the heatsink 38, the heat deterioration of the phosphor layer 34 can be prevented.

A part of the fluorescence YL generated by the phosphor layer 34 is reflected by the reflecting section 37, and is then emitted to the outside of the phosphor layer 34. Further, another part of the fluorescence YL generated by the phosphor layer 34 is emitted to the outside of the phosphor layer 34 without the intervention of the reflecting section 37. In such a manner, the fluorescence YL is emitted from the phosphor layer 34 toward the first pickup optical system 26.

The fluorescence YL emitted from the phosphor layer 34 is non-polarized light. The fluorescence YL passes through the first pickup optical system 26 and the polarization separation element 50A, and then enters the homogenizer optical system 31.

The P-polarized blue light BL'p having been emitted from the polarization separation element 50A enters the wave plate 28. The wave plate 28 is formed of a ¼ wave plate disposed in the light path between the polarization separation element 50A and the diffuse reflection element 30. Therefore, the P-polarized blue light BL'p having been emitted from the polarization separation element 50A is converted into circularly polarized blue light BL'c by the wave plate 28, and then enters the second pickup optical system 29.

The second pickup optical system 29 is for converging the blue light BL'c toward the diffuse reflection element 30, and is formed of, for example, a pickup lens 29a.

The diffuse reflection element 30 diffusely reflects the blue light BL'c, which has been emitted from the second pickup optical system 29, toward the polarization separation element 50A. As the diffuse reflection element 30, it is preferable to use what causes Lambertian reflection of the blue light BL'c.

The blue light BL'c having been diffusely reflected by the diffuse reflection element 30 is transmitted through the wave plate 28 to thereby be converted into the S-polarized blue light BL's. The blue light BL's enters the polarization separation element 50A. Then, the blue light BL's is reflected by the polarization separation element 50A toward the homogenizer optical system 31.

Thus, it results that the blue light BL's is used as the illumination light WL together with the fluorescence YL having been transmitted through the polarization separation element 50A. In other words, the blue light BL's and the fluorescence YL is emitted from the polarization separation element 50A toward the same direction. Thus, there can be obtained the illumination light (the white light) WL having the blue light BL's and the fluorescence (the yellow light) YL mixed with each other.

The illumination light WL having been emitted from the polarization separation element 50A enters the homogenizer optical system 31. The homogenizer optical system 31 is formed of, for example, a lens array 31a and a lens array 31b. The lens arrays 31a, 31b are each formed of what has a plurality of lenses arranged in an array.

The illumination light WL having been transmitted through the homogenizer optical system 31 enters the polarization conversion element 32. The polarization conversion element 32 is formed of a polarization separation film and a wave plate. The polarization conversion element 32 converts the illumination light WL into linearly polarized light.

The illumination light WL having been emitted from the polarization conversion element 32 enters the overlapping optical system 33. The overlapping optical system 33 is for overlapping the illumination light WL in the illumination target area. The overlapping optical system 33 is formed of, for example, an overlapping lens 33a. Thus, the illuminance distribution in the illumination target area is homogenized.

Figure 3:
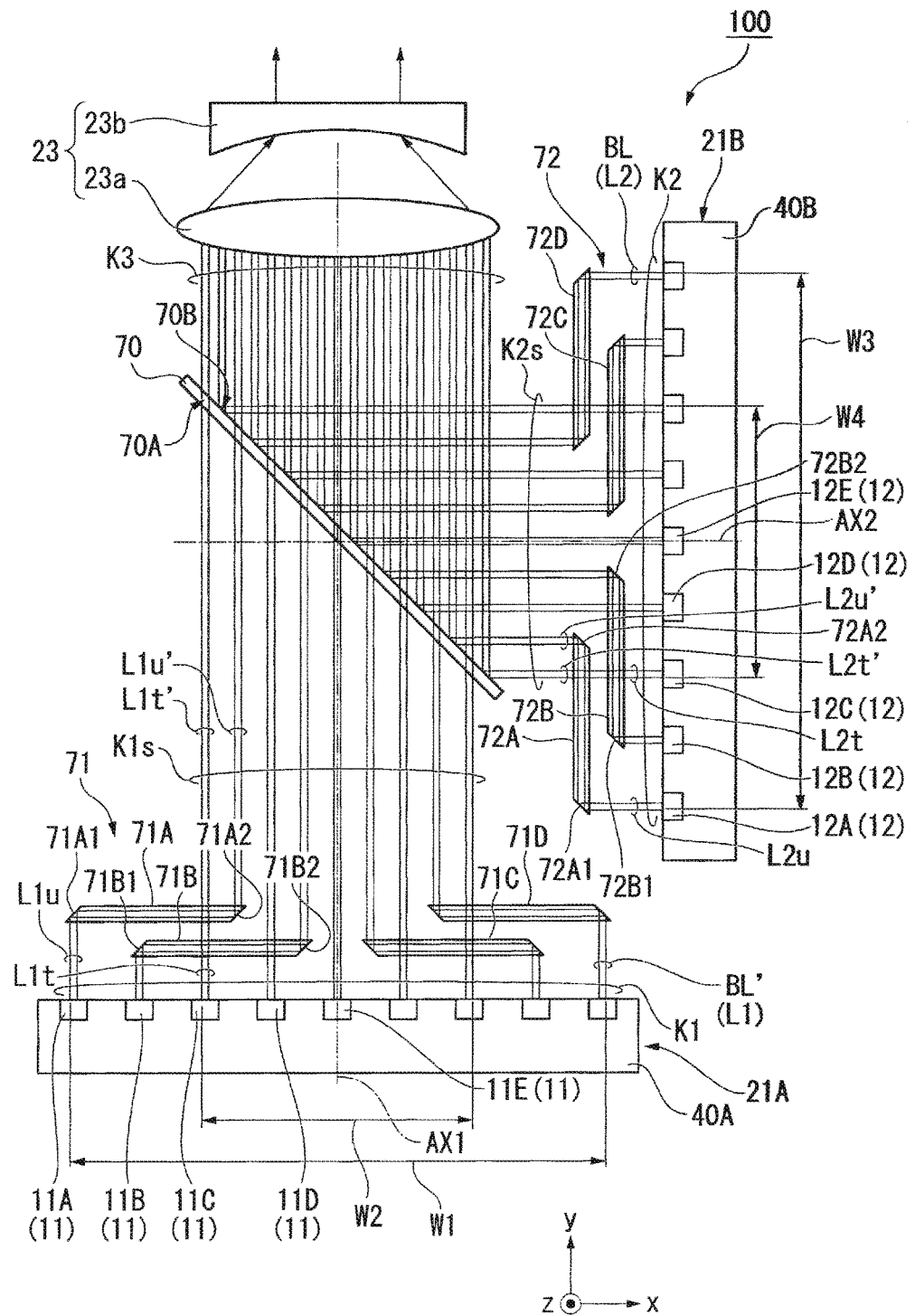
FIG. 3 is a diagram showing a schematic configuration of a light source device.

Next, the details of the light source device 100 will be described. FIG. 3 is a diagram showing a schematic configuration of the light source device 100.

As shown in FIG. 3, the light source device 100 has a first light source unit 21A, a second reduction optical system 71, a second light source unit 21B, a reduction optical system 72, a combining optical system 70, and an afocal optical system 23.

The first light source unit 21A includes a plurality of semiconductor lasers 11, and emits a bundle of light beams K1 including a plurality of light beams L1 emitted from the respective semiconductor lasers 11.

The second light source unit 21B includes a plurality of semiconductor lasers 12, and emits a bundle of light beams K2 including a plurality of light beams L2 emitted from the respective semiconductor lasers 12.

In FIG. 3, the proceeding direction of the bundle of light beams K1 emitted from the first light source unit 21A is defined as a Y direction, the proceeding direction of the bundle of light beams K2 emitted from the second light source unit 21B is defined as a −X direction, and the direction perpendicular to each of the X direction and the Y direction is defined as a Z direction.

The first light source unit 21A and the second reduction optical system 71 each have a bilaterally symmetric configuration centered on an optical axis AX1. Therefore, the configuration of a left part taking the optical axis AX1 as the center in FIG. 3 will hereinafter be described. For the sake of convenience of explanation, the five semiconductor lasers 11 on the left side in FIG. 3 are referred to as semiconductor lasers 11A through 11E, respectively, in sequence from the −X side toward the +X side.

Further, the second light source unit 21B and the reduction optical system 72 each have a vertically symmetric configuration centered on an optical axis AX2. Therefore, the configuration of a lower part taking the optical axis AX2 as the center in FIG. 3 will hereinafter be described. For the sake of convenience of explanation, the five semiconductor lasers 12 on the lower side in FIG. 3 are referred to as semiconductor lasers 12A through 12E, respectively, in sequence from the −Y side toward the +Y side.

The plurality of semiconductor lasers 11 are disposed in a plane (in a plane parallel to the X-Z plane) perpendicular to the optical axis AX1 so as to be arranged in an array. Although not shown in the drawings, in the present embodiment, three laser columns 11 each formed of nine semiconductor lasers 11 arranged along the X direction are arranged in the Z direction, for example. The X direction corresponds to a "second direction" in the appended claims. It should be noted that the number of the semiconductor lasers 11 disposed, and the number of the semiconductor laser columns are not limited to these.

The semiconductor laser 11 emits the blue light BL' with a peak wavelength of, for example, 460 nm as the light beam L1.

The plurality of semiconductor lasers 12 are disposed in a plane (in a plane parallel to the Y-Z plane) perpendicular to the optical axis AX2 so as to be arranged in an array. Although not shown in the drawings, in the present embodiment, three laser columns 12 each formed of nine semiconductor lasers 12 arranged along the Y direction are arranged in the Z direction, for example. The Y direction corresponds to a "first direction" in the appended claims. It should be noted that the number of the semiconductor lasers 12 disposed, and the number of the semiconductor laser columns are not limited to these.

Figure 6:
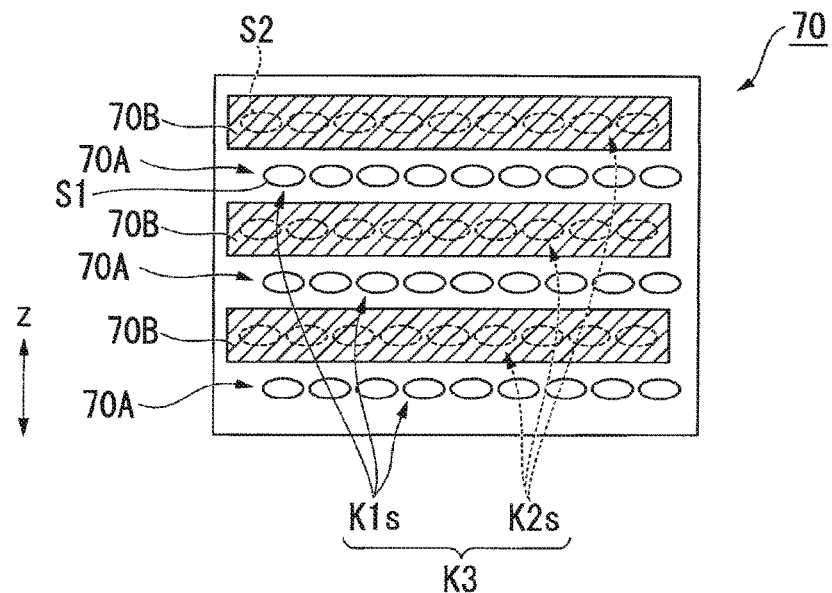
FIG. 6 is a diagram showing a planar configuration of a combining optical system.

In the case of defining the X-Y plane as a reference plane, the distance of the bundle of light beams emitted from any of the laser columns 11 from the reference plane is different from the distance of the bundle of light beams emitted from any of the laser columns from the reference plane (see FIG. 6).

The semiconductor laser 12 emits the excitation light BL with a peak wavelength of, for example, 440 nm as the light beam L2.

The reduction optical system 72 reduces the bundle of light beams K2, which is emitted from the second light source unit 21B, in the Y direction to emit the result as a reduced bundle of light beams K2s. The reduced bundle of light beams K2s having been emitted from the reduction optical system 72 enters the combining optical system 70.

In the present embodiment, the reduction optical system 72 includes prisms 72A, 72B, 72C, and 72D. The prisms 72A, 72B, 72C, and 72D all have the same function with respect to the incident light.

The light beam L2t having been emitted from the semiconductor laser 12C goes straight while being transmitted through the prisms 72B, 72A in sequence. The prism 72A changes the light path of the light beam L2u emitted from the semiconductor laser 12A. The prism 72A has a first reflecting surface 72A1 and a second reflecting surface 72A2. The first reflecting surface 72A1 is disposed so that the light beam L2u enters with an incident angle of 45°. The second reflecting surface 72A2 is disposed so that the light beam L2u having been reflected by the first reflecting surface 72A1 enters with an incident angle of 45°. The second reflecting surface 72A2 is disposed between the light path of the light beam L2t emitted from the semiconductor laser 12C and the light path of the outgoing light from the semiconductor laser 12D.

Thus, the light beam L2u having been emitted from the semiconductor laser 12A is reflected by the first reflecting surface 72A1 of the prism 72A, and the light path of the light beam L2u is bent clockwise as much as 90°. Then, the light beam L2u having been reflected by the first reflecting surface 72A1 proceeds inside the prism 72A, and then reflected by the second reflecting surface 72A2, thus the light path of the light beam L2u is bent counterclockwise as much as 90°. In such a manner, the light beam L2u having entered the prism 72A is emitted as a light beam L2u' with the light path shifted. The light beam L2u' is located between the light path of the light beam L2t emitted from the semiconductor laser 12C and the light path of the light beam L2 emitted from the semiconductor laser 12D.

Focusing attention on the light beam L2t emitted from the semiconductor laser 12C and the light beam L2u emitted from the semiconductor laser 12A, the light path of the light beam L2u is shifted by the reduction optical system 72 (the prism 72A) toward the +Y direction, and the light beam L2t goes straight toward the −X direction with the light path unchanged. Here, the light beam L2t after passing through the reduction optical system 72 (the prism 72A) is defined as a light beam L2t'.

The reduction optical system 72 reduces the distance between the light beam L2u and the light beam L2t in the first direction and then emits the light beam L2u and the light beam L2t as the light beam L2u' and the light beam L2t', respectively. Therefore, in the present embodiment, the light beam L2t corresponds to a "second light beam" in the appended claims, the light beam L2u corresponds to a "third light beam" in the appended claims, the light beam Lt' corresponds to a "fourth light beam" in the appended claims, and the light beam L1u' corresponds to a "fifth light beam" in the appended claims.

The prism 72B changes the light path of the light beam L2 emitted from the semiconductor laser 12B. The prism 72B has a first reflecting surface 72B1 and a second reflecting surface 72B2. The first reflecting surface 72B1 is disposed so that the light beam L2 having been emitted from the semiconductor laser 12B enters with an incident angle of 45°. The second reflecting surface 72B2 is disposed so that the light beam L2 having been reflected by the first reflecting surface 72B1 enters with an incident angle of 45°. The second reflecting surface 72B2 is disposed between the light path of the light beam L2 from the semiconductor laser 12D and the light path of the light beam L2 from the semiconductor laser 12E.

The light path of the light beam L2 emitted from the semiconductor laser 12B is shifted toward the +Y direction similarly to the light beam L2u. In such a manner, the light path of the light beam L2 emitted from the semiconductor laser 12B is disposed between the light path of the light beam L2 from the semiconductor laser 12D and the light path of the light beam L2 from the semiconductor laser 12E after the light beam L2 is emitted from the reduction optical system 72.

The light beam L2 having been emitted from the semiconductor laser 12D goes straight while being transmitted through the prism 72B. The light beam L2 having been emitted from the semiconductor laser 12E goes straight toward the combining optical system 70.

It should be noted that also in the upper part taking the optical axis AX2 as the center, due to the prisms 72C, 72D, it is possible to shift the light path of the light beam L2, which has been emitted from the second light source unit 21B, toward the −Y direction.

According to the present embodiment, the plurality of light beams L2 having been emitted from the plurality of semiconductor lasers 12 is emitted from the reduction optical system 72 in parallel to each other, and in the state of being parallel to the optical axis AX1. In such a manner, the bundle of light beams K2 having a width W3 in the Y direction is converted by the reduction optical system 72 into the reduced bundle of light beams K2s having a width W4 in the Y direction, and is then emitted from the reduction optical system 72.

Figure 4A:
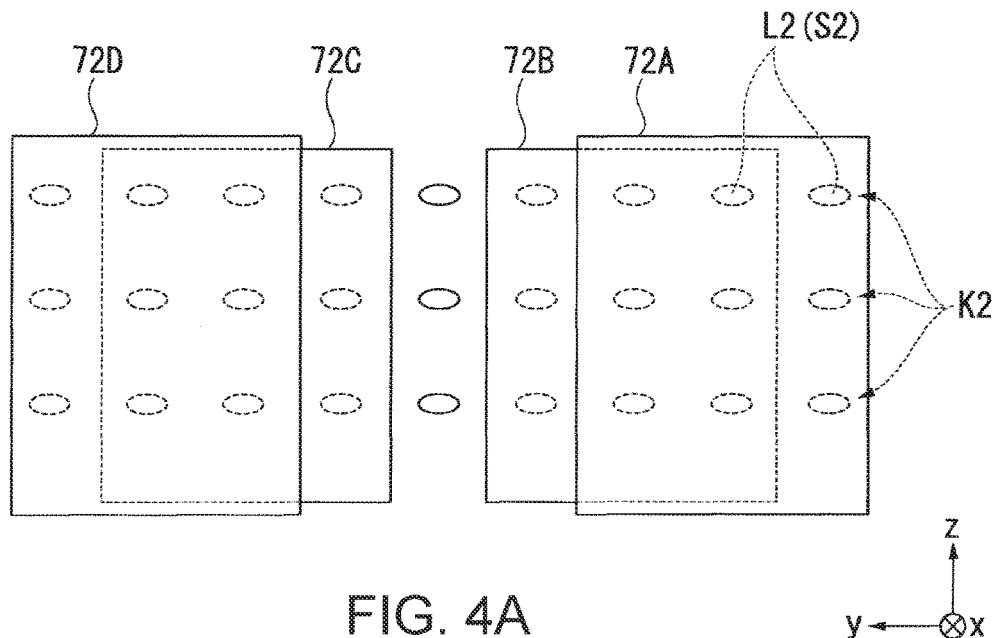
FIG. 4 is a diagram showing an effect of a reduction optical system.
Figure 4B:
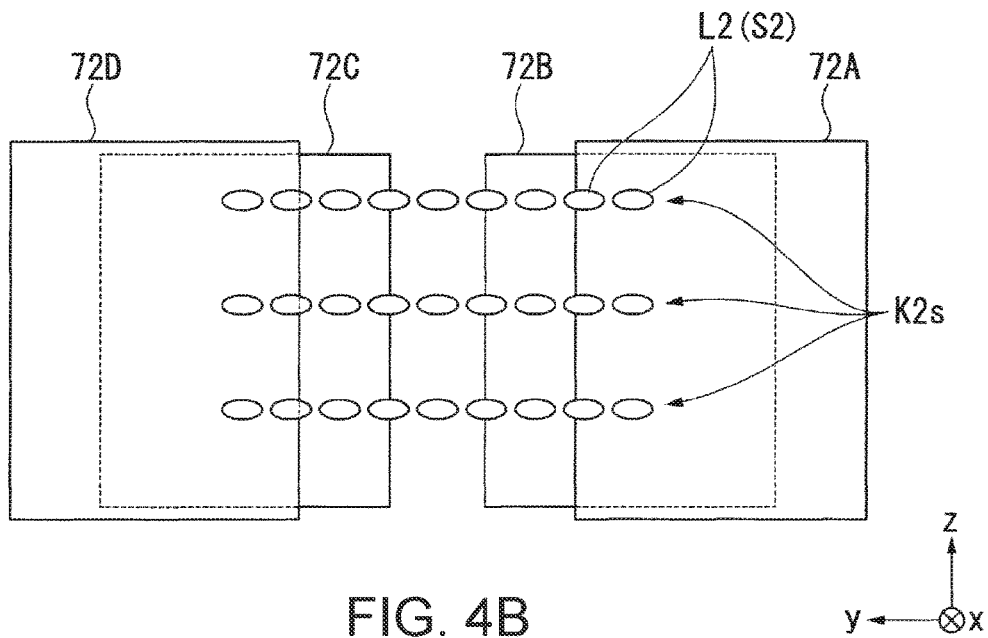

FIG. 4(a) is a diagram showing each of the light beams L2 before being reduced, and FIG. 4(b) is a diagram showing each of the light beams L2 after being reduced. As shown in FIGS. 4(a), 4(b), the spot S2 of the light beam L2 has a roughly elliptical shape having a long axis in the Y direction. In the present embodiment, the reduction optical system 72 reduces the bundle of light beams K2 in the long-axis direction of the sport S2.

Meanwhile, the second reduction optical system 71 compresses the bundle of light beams K1, which is emitted from the first light source unit 21A, in the X direction to emit the result as a reduced bundle of light beams K1s. The reduced bundle of light beams K1s having been emitted from the second reduction optical system 71 enters the combining optical system 70. In the present embodiment, the second reduction optical system 71 includes prisms 71A, 71B, 71C, and 71D. The prisms 71A, 71B, 71C, and 71D all have the same function with respect to the incident light.

The light beam L1t having been emitted from the semiconductor laser 11C goes straight while being transmitted through the prisms 71B, 71A in sequence. The prism 71A changes the light path of the light beam L1u emitted from the semiconductor laser 11A. The prism 71A has a first reflecting surface 71A1 and a second reflecting surface 71A2. The first reflecting surface 71A1 is disposed so that the light beam L1u enters with an incident angle of 45°. The second reflecting surface 71A2 is disposed so that the light beam L1u having been reflected by the first reflecting surface 71A1 enters with an incident angle of 45°. The second reflecting surface 71A2 is disposed between the light path of the light beam L1t emitted from the semiconductor laser 11C and the light path of the light beam L1 from the semiconductor laser 11D.

The light path of the light beam L1u emitted from the semiconductor laser 11A is shifted by the prism 71A toward the +X direction similarly to the light beam L2u. The light beam L1u having entered the prism 71A is emitted as a light beam L1u' with the light path shifted. In such a manner, the light path of the light beam L1u emitted from the semiconductor laser 11A is disposed between the light path of the light beam L1t emitted from the semiconductor laser 11C and the light path of the light beam L1 from the semiconductor laser 11D after the light beam L1u is emitted from the second reduction optical system 71.

Focusing attention on the light beam L1t emitted from the semiconductor laser 11C and the light beam L1u emitted from the semiconductor laser 11A, the light path of the light beam L1u is shifted by the second reduction optical system 71 (the prism 71A) toward the +X direction, and the light beam L1t goes straight toward the +Y direction with the light path unchanged. Here, the light beam L1t after passing through the second reduction optical system 71 (the prism 71A) is defined as a light beam L1t'.

The second reduction optical system 71 reduces the distance between the light beam L1u and the light beam L1t in the second direction and then emits the light beam L1u and the light beam L1t as the light beam L1u' and the light beam L1t', respectively. Therefore, in the present embodiment, the light beam L1t corresponds to a "first light beam" in the appended claims, the light beam L1u corresponds to a "sixth light beam" in the appended claims, the light beam L1t' corresponds to a "seventh light beam" in the appended claims, and the light beam L1u' corresponds to an "eighth light beam" in the appended claims.

The prism 71B changes the light path of the light beam L1 emitted from the semiconductor laser 11B. The prism 71B has a first reflecting surface 71B1 and a second reflecting surface 71B2. The first reflecting surface 71B1 is disposed so that the light beam L1 having been emitted from the semiconductor laser 11B enters with an incident angle of 45°. The second reflecting surface 71B2 is disposed so that the light beam L1 having been reflected by the first reflecting surface 71B1 enters with an incident angle of 45°. The second reflecting surface 71B2 is disposed between the light path of the light beam L1 from the semiconductor laser 11D and the light path of the light beam L1 from the semiconductor laser 11E.

The light path of the light beam L1 emitted from the semiconductor laser 11B is shifted toward the +X direction similarly to the light beam L1u. In such a manner, the light path of the light beam L1 emitted from the semiconductor laser 11B is disposed between the light path of the light beam L1 from the semiconductor laser 11D and the light path of the light beam L1 from the semiconductor laser 11E after the light beam L1 is emitted from the second reduction optical system 71.

The light beam having been emitted from the semiconductor laser 11D goes straight while being transmitted through the prism 71B. Further, the light beam L1 having been emitted from the semiconductor laser 11E goes straight toward the combining optical system 70.

It should be noted that also in the right part taking the optical axis AX1 as the center, due to the prisms 71C, 71D, it is possible to shift the light path of the light beam L1, which has been emitted from the first light source unit 21A, toward the −X direction.

According to the present embodiment, the plurality of light beams L1 having been emitted from the plurality of semiconductor lasers 11 is emitted from the second reduction optical system 71 in parallel to each other, and in the state of being parallel to the optical axis AX1. In such a manner, the bundle of light beams K1 having a width W1 in the X direction is converted by the second reduction optical system 71 into the reduced bundle of light beams K1s having a width W2 in the X direction, and is then emitted from the second reduction optical system 71.

Figure 5A:
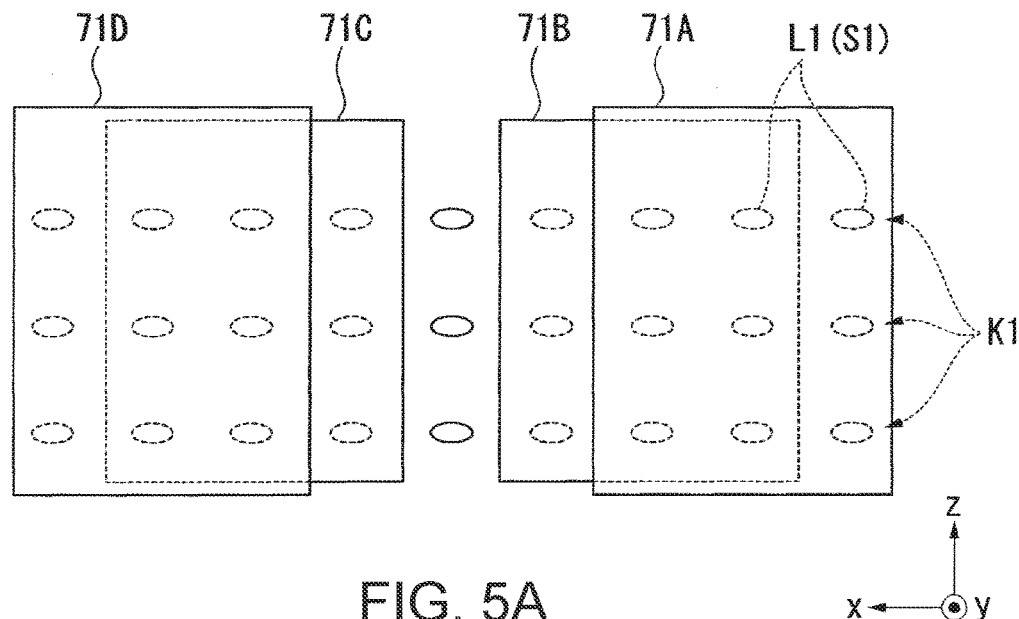
FIG. 5 is a diagram showing an effect of a second reduction optical system.
Figure 5B:
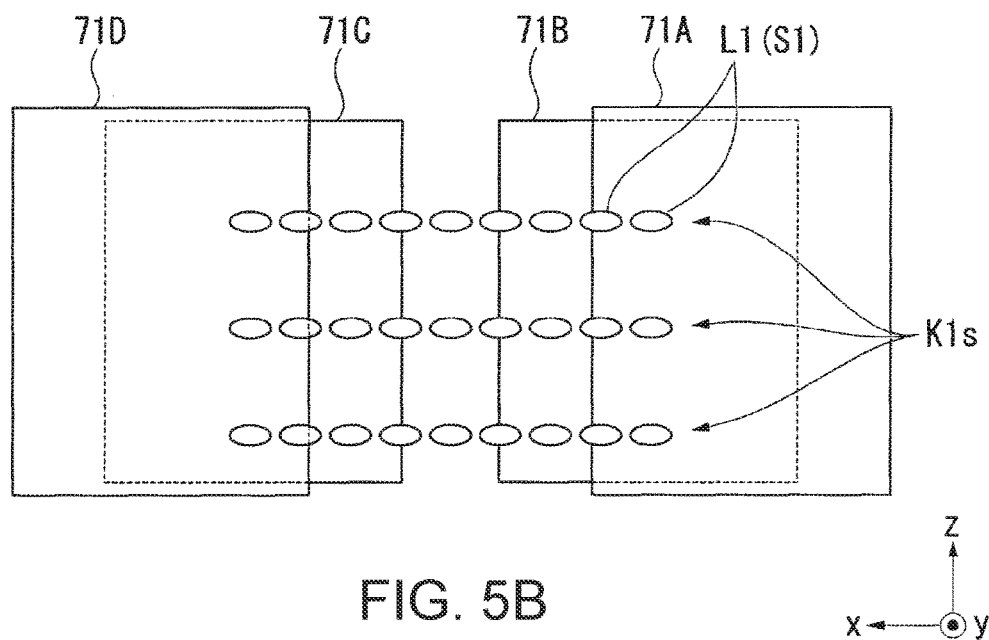

FIG. 5(a) is a diagram showing each of the light beams L1 before being reduced, and FIG. 5(b) is a diagram showing each of the light beams L1 after being reduced. As shown in FIGS. 5(a), 5(b), the spot S1 of the light beam L1 has a roughly elliptical shape having a long axis in the X direction. In the present embodiment, the second reduction optical system 71 reduces the bundle of light beams K1 in the long-axis direction of the sport S1.

As described above, the second reduction optical system 71 and the reduction optical system 72 are each provided with the plurality of prisms. Each of the prisms is provided with the first reflecting surface and the second reflecting surface opposed to each other. The parallelism between the first reflecting surface and the second reflecting surface is determined by the processing accuracy in manufacturing the prisms. Therefore, there is realized the reduction optical system not depending on the installation accuracy of the prisms. Even if the prism rotates minutes angle around the Z axis, the light entering the prism and the light emitted from the prism are parallel to each other. Therefore, it is easy to make the optical axis of the light entering the reduction optical system and the optical axis of the light emitted from the reduction optical system parallel to each other.

Going back to FIG. 3, the combining optical system 70 combines the reduced bundle of light beams K1s emitted from the second reduction optical system 71 and the reduced bundle of light beams K2s emitted from the reduction optical system 72 with each other. The combining optical system 70 is disposed so as to form an angle of 45° with respect to each of the optical axis AX1 and the optical axis AX2.

FIG. 6 is a diagram showing a planar configuration of the combining optical system 70.

As shown in FIG. 6, the combining optical system 70 is formed of a plate-like member having light transmitting areas 70A each for transmitting the reduced bundle of light beams K1s emitted from the second reduction optical system 71, and light reflecting areas 70B each for reflecting the reduced bundle of light beams K2s having been emitted from the reduction optical system 72.

In the present embodiment, as described above, the distance of the bundle of light beams emitted from any of the laser columns 11 from the reference plane is different from the distance of the bundle of light beams emitted from any of the laser columns 12 from the reference plane. Further, the light transmitting areas 70A and the light reflecting areas 70B are alternately arranged in the Z direction.

The light transmitting areas 70A are each formed of, for example, a transparent member, and have a stripe shape. The light transmitting areas 70A each have a long side parallel to the X-Y plane (the reference plane). It should be noted that the light transmitting areas 70A can also be formed of openings shaped like a stripe provided to the substrate.

Further, the light reflecting areas 70B are each formed of, for example, a mirror member made of metal or the like, or a dielectric multilayer film, and have a stripe shape. The light reflecting areas 70B each have a long side parallel to the X-Y plane (the reference plane).

Based on such a configuration, the combining optical system 70 transmits the reduced bundle of light beams K1s emitted from the second reduction optical system 71 to make the reduced bundle of light beams K1s proceed in parallel to the optical axis AX1, and at the same time reflects the reduced bundle of light beams K2s emitted from the reduction optical system 72 to thereby make the reduced bundle of light beams K2s proceed in parallel to the optical axis AX1. Thus, the combined bundle of light beams K3 obtained by combining the reduced bundle of light beams K1s and the reduced bundle of light beams K2s with each other is emitted toward the afocal optical system 23.

As shown in FIG. 6, in the light transmitting areas 70A having the stripe shape, the long-side direction coincides with the long-axis direction of the spots S1, namely the reduction direction of the bundle of light beams K1. Further, similarly, in the light reflecting areas 70B having the stripe shape, the long-side direction coincides with the long-axis direction of the spots S2, namely the reduction direction of the bundle of light beams K2. It should be noted that it is assumed that the spots S1, S2 are the same in size.

Further, in the present embodiment, as shown in FIG. 6, the plurality of spots S1 formed on one of the light transmitting areas 70A and the plurality of spots S2 formed on one of the light reflecting areas 70B are arranged so as to be shifted as much as half a pitch of the spots S1, S2 from each other. Thus, it is possible to improve the homogeneity of the intensity distribution in the cross-section of the combined bundle of light beams K3.

Figure 7:
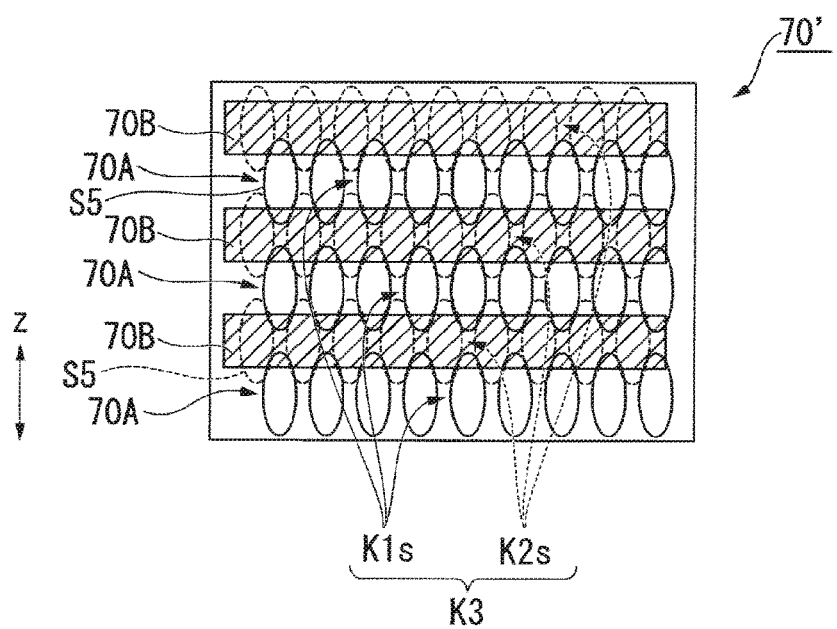
FIG. 7 is a diagram showing a configuration according to a comparative example.

Here, as a comparative example, there is described the case in which the short-axis direction of the spot of each of the light beams coincides with the reduction direction of the bundle of light beams. It is required for the reduced bundle of light beams K1s to be transmitted through the light transmitting area 70A, and it is required for the reduced bundle of light beams K2s to be reflected by the light reflecting area 70B. However, in the case in which the short-axis direction of the spot S5 of each of the light beams after the compression coincides with the reduction direction (the horizontal direction in FIG. 7) of the bundle of light beams as shown in FIG. 7, a part of the reduced bundle of light beams K1s is reflected by the light reflecting area 70B. Further, a part of the reduced bundle of light beams K2s is transmitted through the light transmitting area 70A. As described above, a loss occurs when combining the reduced bundle of light beams K1s and the reduced bundle of light beams K2s with each other to generate the combined bundle of light beams K3. In order to prevent the loss, it is required to increase the distance between the two laser columns adjacent to each other in the Z direction to thereby prevent the reduced bundle of light beams K1s from entering the light reflecting areas 70B, and prevent the reduced bundle of light beams K2s from entering the light transmitting areas 70A.

In contrast, according to the present embodiment, there is a low possibility that the loss occurs when generating the combined bundle of light beams K3. Therefore, it is possible to efficiently use the reduced bundle of light beams K1s and the reduced bundle of light beams K2s.

The afocal optical system 23 is an afocal optical system as a reduction system for further reducing the luminous flux width of the combined bundle of light beams K3 (the excitation light BL and the blue light BL'). The afocal optical system 23 is formed of, for example, a convex lens 23a and a concave lens 23b.

If the combined bundle of light beams K3 can be made sufficiently thin, the afocal optical system 23 is unnecessary. In the case of attempting to make the combined bundle of light beams K3 thinner, it is sufficient to use a conventional afocal optical system 23. However, in the case in which the afocal magnification ratio of the afocal optical system 23 is high, it becomes easy to be affected by the installation variation in the first light source unit 21A (the semiconductor lasers 11) and the second light source unit 21B (the semiconductor lasers 12). Specifically, there is a possibility that the variation in proceeding direction of laser beams in the combined bundle of light beams K3 increases, and thus, the combined bundle of light beams K3 cannot efficiently enter the desired area. There is a possibility that, for example, displacement occurs in the incident position to the phosphor layer 34 described later, and thus, it becomes unachievable to efficiently generate the fluorescence. Therefore, in the case in which the afocal magnification ratio is high, a high alignment accuracy is required for the light source units 21A, 21B.

Therefore, it is necessary to hold the afocal magnification ratio of the afocal optical system 23 to a rather low level taking, for example, the installation variation of the light source units 21A, 21B into consideration. However, if the afocal magnification ratio is lowered, the light beam emitted from the light source device 100 cannot sufficiently be thinned.

In contrast, in the present embodiment, since the combined bundle of light beams K3 reduced by the second reduction optical system 71 and the reduction optical system 72 enters the afocal optical system 23, it is possible to use the afocal optical system 23 relatively low in afocal magnification ratio.

Further, in the light source device 100, since the luminous flux width of the combined bundle of light beams K3 is reduced, the afocal optical system 23 small in size can be adopted.

Therefore, according to the present embodiment, it is possible to miniaturize the optical elements in the posterior stage such as the integrator optical system 24, the optical element 25A, and the first pickup optical system while suppressing the loss of the combined bundle of light beams K3. By extension, it is possible to achieve miniaturization of the illumination device 2 and the projector 1.

It should be noted that the invention is not necessarily limited to the embodiment described above, but a variety of modifications can be added within the scope or the spirit of the invention.

For example, in the embodiment described above, the case in which the second reduction optical system 71 and the reduction optical system 72 are provided respectively for the first light source unit 21A and the second light source unit 21B is cited as an example, but the invention is not limited to this example. For example, it is also possible to provide either one of the second reduction optical system 71 and the reduction optical system 72 alone.

Further, although the case in which the reduced bundle of light beams K1s is transmitted through the light transmitting areas 70A, and the reduced bundle of light beams K2s is reflected by the light reflecting areas 70B is cited as an example, it is also possible to use the combining optical system 70 configured so that the reduced bundle of light beams K1s is reflected by the light reflecting areas 70B, and the reduced bundle of light beams K2s is transmitted through the light transmitting areas 70A.

Further, in the embodiment described above, the peak wavelength of the excitation light BL is 440 nm, and the peak wavelength for the blue light BL' is 460 nm. However, the peak wavelengths of the excitation light BL and the blue light BL' are not necessarily limited to such an example.

Further, although in the embodiment described above, there is illustrated the projector 1 provided with the three light modulation devices 4R, 4G, and 4B, the invention can also be applied to a projector for displaying a color picture with a single light modulation device.

Besides the above, the shape, the number, the arrangement, the material, and so on of the variety of constituents of the illumination device and the projector are not limited to those of the embodiment described above, but can arbitrarily be modified.

Further, although in the embodiment described above, there is described the example of installing the illumination device according to the invention in the projector, the invention is not limited to the example. The illumination device according to the invention can also be applied to a lighting equipment, a headlight of a vehicle, and so on.

The entire disclosure of Japanese Patent Application No. 2015-066735, filed on Mar. 27, 2015 is expressly incorporated by reference herein.

REFERENCE SIGNS LIST

1 . . . projector
2 . . . illumination device
4R, 4G, 4B . . . light modulation device
6 . . . projection optical system
21A . . . first light source unit
21B . . . second light source unit
32 . . . wavelength conversion element
70 . . . combining optical system 70A . . . light transmitting area
70B . . . light reflecting area
71 . . . second reduction optical system
72 . . . reduction optical system
100 . . . light source device
K1, K2 . . . bundle of light beams
K1s . . . reduced bundle of light beams
K2s . . . reduced bundle of light beams
AX2 . . . optical axis (optical axis of reduced bundle of light beams)
light beam L1t (first light beam)
light beam L1u (sixth light beam)
light beam L1t' (seventh light beam)
light beam L1u' (eighth light beam)
light beam L2t (second light beam)
light beam L2u (third light beam)
light beam L2t' (fourth light beam)
light beam L2u' (fifth light beam)

The invention claimed is:

1. A light source device comprising:
a first light source unit adapted to emit a first light beam;
a second light source unit adapted to emit a bundle of light beams including a second light beam and a third light beam arranged in a first direction;
a reduction optical system adapted to reduce the bundle of light beams in the first direction to emit as a reduced bundle of light beams; and
a combining optical system adapted to one of transmit and reflect the first light beam and one of reflect and transmit the reduced bundle of light beams to thereby combine the first light beam and the reduced bundle of light beams with each other,
wherein defining a plane including an optical axis of the reduced bundle of light beams and parallel to the first direction as a reference plane, a distance between the first light beam and the reference plane is different from a distance between the second light beam and the reference plane,
the reduction optical system reduces a distance between the second light beam and the third light beam in the first direction, and emits the second light beam and the third light beam as a fourth light beam and a fifth light beam, respectively,
the combining optical system is provided with a light transmitting area having a long side parallel to the reference plane and a light reflecting area having a long side parallel to the reference plane, and
the first light beam enters one of the light transmitting area and the light reflecting area, and the fourth light beam and the fifth light beam enter the other of the light transmitting area and the light reflecting area.

2. The light source device according to claim 1, wherein
a cross-sectional shape of the second light beam and a cross-sectional shape of the third light beam both have a longitudinal direction in the first direction.

3. The light source device according to claim 2, further comprising:
a second reduction optical system,
wherein the first light source unit further emits a sixth light beam,
the sixth light beam is arranged with the first light beam in a second direction crossing the first direction,
the second reduction optical system reduces a distance between the first light beam and the sixth light beam in the second direction, and emits the first light beam and the sixth light beam as a seventh light beam and an eighth light beam, respectively, and
the seventh light beam and the eighth light beam enter one of the light transmitting area and the light reflecting area.

4. An illumination device comprising:
the light source device according to claim 3;
a wavelength conversion element; and
a light guide optical system adapted to guide at least a part of the first light, the fourth light beam, and the fifth light beam to the wavelength conversion element.

5. A projector comprising:
the illumination device according to claim 4;
a light modulation device adapted to modulate light emitted from the illumination device in accordance with image information to thereby form image light; and
a projection optical system adapted to project the image light.

6. An illumination device comprising:
the light source device according to claim 2;
a wavelength conversion element; and
a light guide optical system adapted to guide at least a part of the first light, the fourth light beam, and the fifth light beam to the wavelength conversion element.

7. A projector comprising:
the illumination device according to claim 6;
a light modulation device adapted to modulate light emitted from the illumination device in accordance with image information to thereby form image light; and
a projection optical system adapted to project the image light.

8. The light source device according to claim 1, further comprising:
a second reduction optical system,
wherein the first light source unit further emits a sixth light beam,
the sixth light beam is arranged with the first light beam in a second direction crossing the first direction,
the second reduction optical system reduces a distance between the first light beam and the sixth light beam in the second direction, and emits the first light beam and the sixth light beam as a seventh light beam and an eighth light beam, respectively, and
the seventh light beam and the eighth light beam enter one of the light transmitting area and the light reflecting area.

9. An illumination device comprising:
the light source device according to claim 8;
a wavelength conversion element; and
a light guide optical system adapted to guide at least a part of the first light, the fourth light beam, and the fifth light beam to the wavelength conversion element.

10. A projector comprising:
the illumination device according to claim 9;
a light modulation device adapted to modulate light emitted from the illumination device in accordance with image information to thereby form image light; and
a projection optical system adapted to project the image light.

11. An illumination device comprising:
the light source device according to claim 1;
a wavelength conversion element; and
a light guide optical system adapted to guide at least a part of the first light, the fourth light beam, and the fifth light beam to the wavelength conversion element.

12. A projector comprising:
the illumination device according to claim 11;
a light modulation device adapted to modulate light emitted from the illumination device in accordance with image information to thereby form image light; and
a projection optical system adapted to project the image light.

\* \* \* \* \*